UNITED STATES PATENT OFFICE.

HEINRICH ERNST ADOLPHE SAALE, OF CHISWICK, COUNTY OF MIDDLESEX, ASSIGNOR OF ONE-HALF TO JOHN PICKERING, OF LONDON, ENGLAND.

MIXED PAINT.

SPECIFICATION forming part of Letters Patent No. 356,505, dated January 25, 1887.

Application filed October 8, 1884. Serial No. 145,014. (Specimens.)

*To all whom it may concern:*

Be it known that I, HEINRICH ERNST ADOLPHE SAALE, of 67 Linden Gardens, Chiswick, in the county of Middlesex, England, decorator, have invented an Improved Anti-Fouling Composition for Coating Ships' Bottoms and Submerged Metal Structures, of which the following is a specification.

The object of the present invention is to provide an anti-fouling composition or paint for coating ships' bottoms and submerged metal structures, which shall resist the action of sea-water and prevent the adhesion of animal and vegetable growths which so impede the motion of sea-going vessels.

In carrying my invention into effect I make use of the following substances, which, in combination, have been found by experiment to be, by reason of their peculiar characteristics, perfectly adapted to the production of a composition of the kind in question. These substances are carbonate of baryta, arsenic, powdered oyster-shells, oxide of zinc, red lead, and sal-oxide of potash, otherwise called "quadroxalate of potash." Of these ingredients the baryta is fatal to vegetable life and the arsenic to animal life, while the powdered oyster-shell possesses the peculiar property of preventing vegetable growths and repelling oysters and other shell-fish, such as barnacles. The oxide of zinc is employed to resist the action of the sea-water, and is valuable in admixture with the red lead to reduce the specific gravity of the latter and prevent the formation of heavy sedimentary deposits when the several ingredients are mixed with the vehicle or varnish, which enables them to be properly applied over and maintained upon the surface to be coated, and the composition of which vehicle or varnish will be presently explained. The sal-oxide or quadroxalate of potash possesses the property of destroying both animal and vegetable life, and it therefore, in a measure, combines the advantages of the baryta and arsenic; but it has also the property of imparting to the composition, when properly blended with the other ingredients and the varnish with which they are mixed, a glossy hard surface, for which reason it is preferred to use it in addition to the baryta and arsenic in the manufacture of my anti-fouling composition.

The above-named substances may be considered as the essential ingredients in the composition; but to these may be added a suitable drier, such as oxide of mercury or sugar of lead.

A drier must be regarded as a more or less indispensable ingredient when the composition is to be used on ships, as, owing to the limited time available or allowed in dry-dock, the composition must be such as will dry rapidly when applied to the hull. These ingredients, in or about the proportions to be subsequently given, are mixed together in a dry state, and are then ground into a paint, along with a vehicle or varnish the preparation of which I will now describe. This vehicle or varnish consists of a shellac or spirit-varnish and of a rosin-varnish made separately and mixed cold. The shellac-varnish consists of about twenty-five parts of shellac dissolved in about one hundred and fifteen parts of methylated spirit, to which is preferably added five parts of galipot, or its equivalent, to prevent cracking. The rosin-varnish consists of rosin, boiled linseed-oil, turpentine, and spirit of tar, in or about the following proportions: rosin, ten parts; boiled linseed-oil, forty-five parts; turpentine, fifteen parts; spirit of tar, five parts, (a volatile oil distilled from tar, specific gravity 0.970.) These ingredients are heated together until they become thin, and the fluid is then allowed to cool. The two varnishes having been separately prepared, and in a cold or cool state, are mixed together, and constitute the vehicle or medium with which I prefer to incorporate the mixture of dry ingredients above named, as it is impervious to water and unaffected by variations in the temperature of the sea. These dry ingredients I use in or about the following proportions: carbonate of baryta, five parts; arsenic, twenty parts; crushed or powdered oyster-shell, seventy-five parts; oxide of zinc, five parts; red lead, fifteen parts; sal-oxide or quadroxalate of potash, ten parts, and sugar of lead (or an equivalent drier) ten parts. These ingredients, with the exception of the powdered oyster-shell, are procurable ready for use; but the oyster-shells require to be reduced in a pulverizer to a fine powder before they can be properly mixed with the other ingredients.

It has been found by experiment and research that certain shells—such as crushed or powdered mussel or scallop shells—serve to promote vegetable growths, and to attract oysters, barnacles, and other shell-fish to surfaces coated therewith, but that it is just the opposite with certain other shells—such as crushed oyster-shells—which crustacea generally shrink from approaching. These dry ingredients are then ground in a suitable mill with the varnish or vehicle above described, and I thereby obtain a paint or composition perfectly suited for protecting submerged metal bodies. The baryta, oyster-shell, and quadroxalate of potash would combine and form a hard rocky substance; but as they are well ground before being mixed they are dissolved by the action of the spirits of tar, shellac, and methylated spirits, and cannot form a rocky substance. The paint rapidly dries, and presents a hard glossy surface. It is found that two coats are enough, and when this composition is used there is no need for painting the hull with a separate coat of red lead, as the presence in the composition of the oxide of zinc and red lead preserves iron and copper from oxidation and wood from decay.

Any suitable coloring-matter—such as Venetian red—may be added to the anti-fouling composition. I find that about seventy-five parts of Venetian red added to the composition makes a serviceable paint of an agreeable color; but other pigments may be added to the composition at the discretion of the manufacturer.

It may be mentioned that the proportions of the several ingredients above given are calculated by weight, and are those which I have found to answer well in practice. I do not, however, limit myself to the precise proportions given for the dry ingredients, nor to the precise proportions and ingredients of the vehicle or varnish with which such dry ingredients are ground into paint, as the same may be somewhat varied without departing from the scope of my invention.

Having now particularly described the nature of my said invention and in what manner the same is to be performed, I declare that what I claim is—

1. The improved anti-fouling composition or paint for ships' bottoms and submerged structures, consisting of carbonate of baryta, arsenic, crushed or powdered oyster-shell, oxide of zinc, red lead, sal-oxide or quadroxalate of potash, and a suitable drier—such as sugar-of-lead—in admixture with a vehicle or medium composed of shellac-varnish and rosin-varnish, substantially as and for the purpose specified.

2. In an anti-fouling composition or paint for ships' bottoms and submerged metal structures, the combination of baryta, arsenic, crushed or powdered oyster-shell, oxide of zinc, red lead, and sal-oxide or quadroxalate of potash, substantially as and for the purpose specified.

3. An anti-fouling composition or paint containing crushed oyster-shell and quadroxalate of potash, for the purpose of preventing animal and vegetable growths and repelling barnacles and crustacea generally, as set forth.

4. An anti-fouling composition or paint for ships containing carbonate of baryta, arsenic, and crushed oyster-shell, in about the proportions and for the purpose specified.

5. An anti-fouling composition or paint for ships' bottoms containing crushed or powdered oyster-shell and sal-oxide or quadroxalate of potash, in admixture with a varnish prepared from shellac and rosin in the manner hereinabove specified.

HEINRICH ERNST ADOLPHE SAALE.

Witnesses:
W. J. NORWOOD,
JOHN DEAN,
*Both of 17 Gracechurch St., London.*